W. F. SCHACHT.
MOLD FOR MOLDING STOPPLES.
APPLICATION FILED NOV. 6, 1908.

923,585.

Patented June 1, 1909.
2 SHEETS—SHEET 1.

Witnesses
James B. Mansfield
L. E. Witham

Inventor
William F. Schacht
By Alexander Powell
Attorneys

W. F. SCHACHT.
MOLD FOR MOLDING STOPPLES.
APPLICATION FILED NOV. 6, 1908.
923,585.
Patented June 1, 1909.
2 SHEETS—SHEET 2.
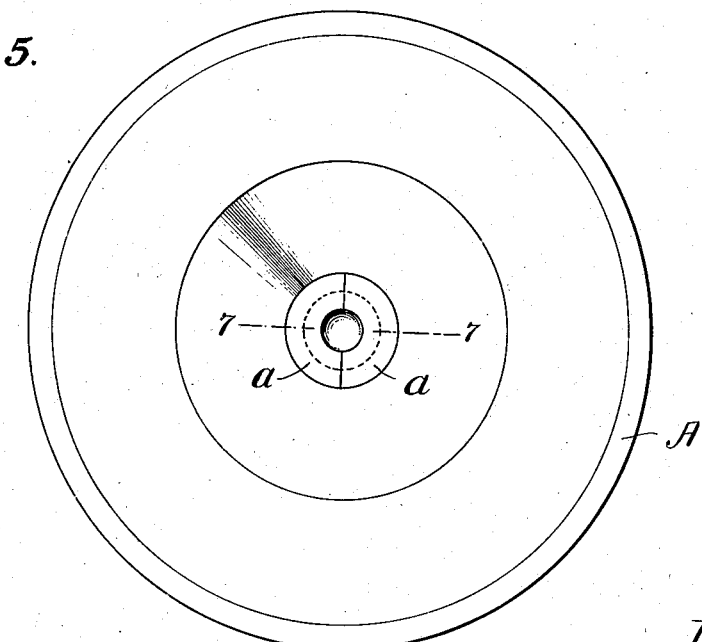
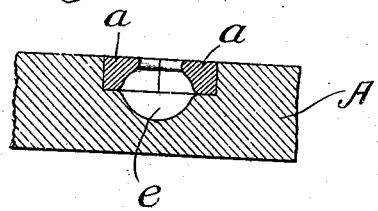
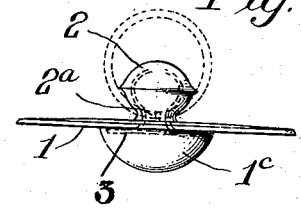
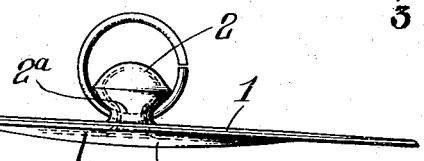
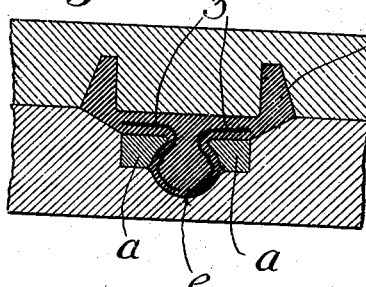
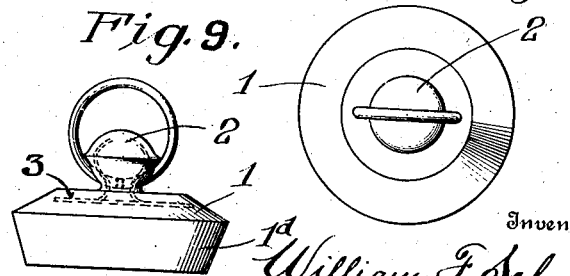
Witnesses
James B Mansfield
L. E. Witham.
Inventor
William F. Schacht
By
Alexander Dowell
Attorneys

UNITED STATES PATENT OFFICE.

WILLIAM F. SCHACHT, OF GOSHEN, INDIANA.

MOLD FOR MOLDING STOPPLES.

No. 923,585.                Specification of Letters Patent.                Patented June 1, 1909.

Application filed November 6, 1908. Serial No. 461,408.

*To all whom it may concern:*

Be it known that I, WILLIAM F. SCHACHT, of Goshen, in the county of Elkhart and State of Indiana, have invented certain new and useful Improvements in Molds for Molding Stopples; and I hereby declare that the following is a full, clear, and exact description thereof, reference being had to the accompanying drawings, which form part of this specification.

This invention relates to molds for molding stopples for sinks, bath tubs, and the like, out of rubber or like plastic material. Such stopples being of the character shown in my Patent No. 901,195, dated October 13, 1908, and are each provided with an integral globular shaped knob on its upper side.

The object of this invention is to enable such stopples to be accurately formed at one operation in the mold, and to be readily removed from the mold after they are vulcanized; and the present invention consists in the novel construction of the molds as illustrated in the accompanying drawings and hereinafter described and claimed.

Figure 1:
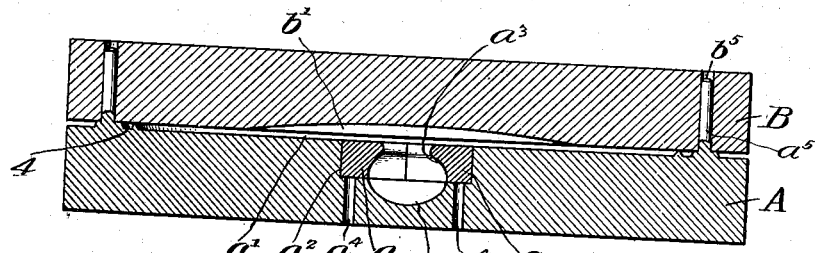
Figure 2:
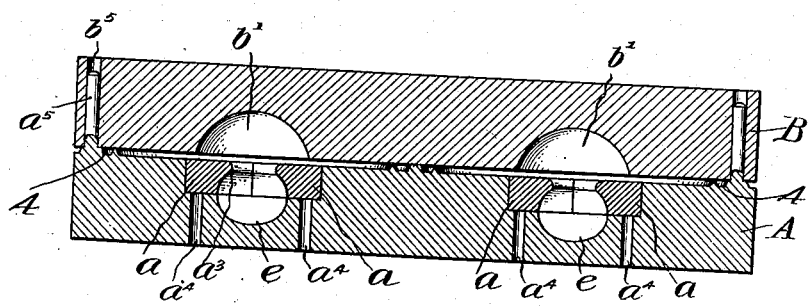
Figure 3:
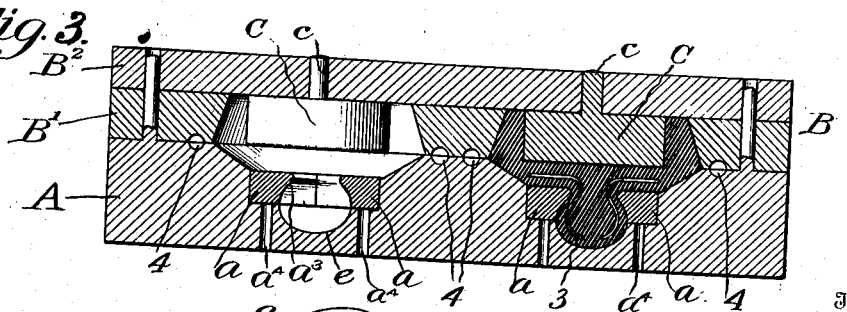
Figure 4:
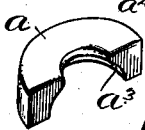

In the drawings—Figure 1 is a central vertical sectional view of a mold for making sink stopples. Fig. 2 is a similar view of part of a mold for basin stopples constructed in accordance with the invention and by which a plurality of such stopples may be simultaneously produced. Fig. 3 is a sectional view of a bath-tub-stopple mold constructed in accordance with the invention. Fig. 4 is a detail perspective view of one of the removable mold parts $a$. Fig. 5 is a top plan view of the lower part of a stopple mold, showing the removable parts $a$, $a$, in plan. Fig. 6 is a detail transverse section on line 7—7, Fig. 5. Fig. 7 is a side view of a basin stopple produced by the molds shown in Fig. 2. Fig. 8 is a side view of a sink-stopple produced by the molds shown in Figs. 1 and 2, and having a metal ring attached to the knob. Fig. 9 is a sectional view, and Fig. 10 a plan view of a bath-tub-stopple produced by the mold shown in Figs. 3 and 11. Fig. 11 is a sectional view of a slight modification of the mold for forming bath-tub-stopples.

The basin and sink stopples as shown in my said patent and as shown in Figs. 7 and 8 comprise a circular disk-like body portion 1, having a central integral knob 2 connected with the body portion 1 by an integral stem $2^a$.

Each mold as shown has a lower flask portion A and an upper cope portion B. The opposed faces of the parts A and B are recessed as at $a'$ and $b'$ together forming a cavity corresponding exactly to the form of the body of the stopple to be produced in such mold.

In the center of the recess $a'$ is a circular cavity $a^2$ in which are placed two opposite similar removable parts $a$, $a$, which are semi-circular and recessed in their adjacent faces as at $a^3$, so that when the parts $a$ are fitted together in the cavity $a^2$ the exposed recesses in said parts and in the cavity together correspond in contour to the exposed knob and stem of the stopple.

As shown in Fig. 2 the parts $a$ contain the entire recess for the knob; but preferably instead of the parts $a$ containing the entire recess the bottom of the cavity $a^2$ can be centrally concaved as shown at $e$ (Figs. 1, 2, 3, 6 and 11) to shape the upper half of the top of the knob, and the removable parts $a$, can be shaped to form the underside of the knob and the neck, as indicated in said figures.

To facilitate removal of the parts $a$, holes $a^4$ can be made in the part A as indicated in Figs. 1, 2 and 3 of the drawings. The parts A and B may be properly centered or alined relatively to each other by means of pins $a^5$ on one member engaging corresponding holes $b^5$ in the other; or by other suitable means.

Fig. 8 shows a sink stopple which can be produced by the mold shown in Figs. 1, 2, 5 and 6. The metal ring indicated in this figure however being inserted in the neck of the knob after the stopple has been molded.

The basin stopple shown in Fig. 7 has a semiglobular protuberance on its under side; this may be formed by the mold shown in Fig. 2; the construction of this mold is similar to that for the sink stopple, except the cavity $b'$ in part B is shaped to correspond in contour to the underside of the stopple to be produced.

Obviously a plurality of stopples can be produced in one mold by providing it with a plurality of suitable recesses; as indicated in Fig. 2, which shows a mold adapted to produce two basin stopples at each operation.

In some cases the part A may be made in sections; thus in Fig. 3 the part A is shown as divided longitudinally, the lower part $A^2$ thereof forming a base upon which the part $A'$ rests and the cavity $a^2$ in such case extending entirely through the part A'. Again in some cases the part B may be made in two sections thus, as indicated in Fig. 3, the part B is divided longitudinally the upper portion B² being practically imperforate while the cavities are all formed in the lower part B'. This construction is particularly useful for making molds for producing the bathtub-stopples shown in Figs. 9 and 10, which bath-tub-stopples instead of having the marginal portion 1ᶜ extending radially from the body, as do the sink and basin stopples, has it bent down to form a depending flange 1ᵈ as indicated in the drawings. In order to form this flange it is necessary to form an annular channel in the part B of the mold and this may be more conveniently done by constructing this part of the mold in two sections as indicated in Fig. 3, the lower section B' being provided with openings in which are centered disks C attached to the section B² by pins $c$ as shown. In this way the cavity for the flange 1ᵈ can be more cheaply made than by attempting to cut an annular groove in a solid plate.

In making the stopples I preferably take a piece of sheet rubber, which may be cut into disk form if desired, and place thereon a small disk of canvas and place them in the lower part of the mold, and then place thereover another disk of rubber, and preferably sufficient additional rubber to insure the filling of the cavities in the mold and proper forming of the thicker portions of the stopple. Then the mold is closed and the parts A and B forcibly compressed together thereby compelling the rubber to fill every portion of the mold recess; this compression forces the canvas, indicated at 3 in the drawing, down into the knob portion of the stopple in which it forms a tough flexible stiffening and reinforcing connection between the knob and stopple proper. The mold is then fastened and subjected to sufficient heat to vulcanize the rubber. Any surplus rubber will be crowded over the edge of the mold recess into overflow spaces 4 which surround the mold recesses as indicated in the drawings, see Figs. 1 to 3. After the vulcanizing is completed the mold can be opened and the stopple readily removed. If the parts $a$ should bind because of the close fit between them and the cavity $a^2$ of the mold, they can easily be knocked out by inserting a suitable tool through the holes $a^4$.

Having described my invention what I claim as new and desire to secure by Letters Patent thereon is:

1. A mold for rubber stopples having integral knobs, said mold comprising an upper and a lower portion with a concavity between corresponding to the form of the stopple body, a central cavity in one portion having its end shaped to form the outer half of the stopple knob, and removable recessed pieces located in said cavity the recesses in said pieces connecting with the recess in the mold portions and corresponding to the inner half of the knob and its stem, substantially as and for the purpose set forth.

2. The herein described mold for stopples having knob-like handles, comprising opposite portions, the upper portion being recessed on its meeting face to correspond in contour to the under side of the stopple to be formed, and the lower member being recessed in its meeting face to correspond in contour to the top side of the body of the stopple to be formed and having a central cavity, the bottom of said cavity being recessed to shape the upper part of the knob-like handle of the stopple; with a pair of removable parts removably fitted in the upper part of said cavity and recessed on their opposed faces to shape the stem and lower part of the knob of the stopple, substantially as described.

In testimony that I claim the foregoing as my own, I affix my signature in presence of two witnesses.

WILLIAM F. SCHACHT.

Witnesses:
 WM. H. CHARNLEY,
 HENRY W. PEASE.